(12) United States Patent
Spenger et al.

(10) Patent No.: US 10,065,137 B2
(45) Date of Patent: Sep. 4, 2018

(54) DEVICE FOR SEPARATING AND REMOVING MATERIAL TO BE SIEVED FROM A FLOWING LIQUID CONTAMINATED WITH MATERIAL TO BE SIEVED

(71) Applicant: Huber SE, Berching (DE)

(72) Inventors: Franz Spenger, Röttenbach (DE); Christian Brüderl, Schernfeld (DE); Christian Breinl, Berching (DE)

(73) Assignee: Huber SE, Berching (DE)

( * ) Notice: Subject to any disclaimer, the term of this patent is extended or adjusted under 35 U.S.C. 154(b) by 173 days.

(21) Appl. No.: 15/007,419

(22) Filed: Jan. 27, 2016

(65) Prior Publication Data
US 2016/0263502 A1    Sep. 15, 2016

(30) Foreign Application Priority Data

Feb. 27, 2015    (DE) .................. 10 2015 102 817

(51) Int. Cl.
*B01D 33/80*    (2006.01)
*E02B 8/02*    (2006.01)
(Continued)

(52) U.S. Cl.
CPC ............ *B01D 33/803* (2013.01); *E02B 8/026* (2013.01); *E03F 5/14* (2013.01); *B01D 2029/033* (2013.01)

(58) Field of Classification Search
CPC .......... B01D 33/803; E03F 5/14; E02B 8/026
See application file for complete search history.

(56) References Cited

U.S. PATENT DOCUMENTS 3,059,569 A * 10/1962 Nolt .................. A01F 15/04
100/179
3,315,777 A * 4/1967 Margles .............. B65G 47/66
198/325
(Continued)

FOREIGN PATENT DOCUMENTS

DE        409981        2/1925
DE        7141486       2/1972
(Continued)

OTHER PUBLICATIONS

Search Report, German Patent Application No. 10 2015 102 817.4 dated Oct. 19, 2015.
(Continued)

*Primary Examiner* — Chester T Barry
(74) *Attorney, Agent, or Firm* — JK Intellectual Property Law, PA

(57) ABSTRACT

A device for separating and removing material to be sieved from flowing liquid includes a screen forming a sieve surface and fixed to a frame with grate bars arranged beside one another and separated from each other. At least one cleaning rake with numerous cleaning prongs can be in a conveying direction along the screen via a drive. When the cleaning prongs pass the screen, they engage at least in sections between adjacent grate bars to remove the material to be sieved and held back by the screen, thereby conveying it towards a discharge. The cleaning prongs may be configured to be movable laterally back and forth with regard to the conveying direction and with regard to the screen.

18 Claims, 5 Drawing Sheets

(51) Int. Cl.
 *E03F 5/14* (2006.01)
 *B01D 29/03* (2006.01)

(56) References Cited

U.S. PATENT DOCUMENTS

| | | | | | |
|---|---|---|---|---|---|
| 4,561,975 | A | * | 12/1985 | Schloss, Jr. ............ | B01D 25/38 210/155 |
| 5,534,140 | A | * | 7/1996 | Brummond ............. | E02B 8/026 210/106 |
| 2007/0102334 | A1 | * | 5/2007 | Wilcher ............... | B01D 29/445 210/159 |

FOREIGN PATENT DOCUMENTS

| | | |
|---|---|---|
| DE | 7242339 | 3/1973 |
| DE | 4406122 | 8/1995 |
| DE | 10 2010 023 249 | 12/2011 |
| DE | 10 2011 082 629 | 3/2013 |
| DE | 102011082629 | 3/2013 |
| EP | 0672600 A2 | 9/1995 |
| SU | 1071561 A1 * | 2/1984 |
| WO | WO 2009/132367 | 11/2009 |
| WO | WO-2013152988 A1 * | 10/2013 ........... A01F 15/042 |

OTHER PUBLICATIONS

European Search Report for European Application No. 16155423.3 dated Jul. 15, 2016 (with machine translation).

* cited by examiner

DEVICE FOR SEPARATING AND REMOVING MATERIAL TO BE SIEVED FROM A FLOWING LIQUID CONTAMINATED WITH MATERIAL TO BE SIEVED

CROSS-REFERENCE TO RELATED APPLICATIONS

This application claims benefit to German Patent Application No. 10 2015 102 817.4, filed Feb. 27, 2015 which is incorporated in its entirety by reference herein.

TECHNICAL FIELD

The present invention refers to a device for separating and removing material to be sieved from a flowing liquid contaminated with material to be sieved, e.g. sewage, whereby the device has a screen fixed to a frame and forming a sieve surface, with grate bars arranged beside one another and separated from each other, whereby the device encompasses at least one cleaning rake having numerous cleaning prongs, movable along the screen in such a way in conveying direction with the help of a drive that the cleaning prongs engage at least in sections between adjacent grate bars when the screen passes so the material to be sieved held back by the screen can be removed and conveyed towards a device discharge.

BACKGROUND

Such sieve devices are sufficiently known from the state of the art and serve to remove, for example, coarse material to be sieved (wood, stones, etc.) from sewage flowing in a sewer. To achieve this, the sieve device is generally integrated into the sewer in such a way that the sieve surface extends perpendicularly or slightly inclined upwards, starting from the sewer bottom. To allow the discharge of the material to be sieved that has been held back by the screen forming the sieve surface, the latter extends most of the time above the maximum expected water level.

The rotating operation of the cleaning rake (from which more than one can be provided as well) causes the material to be sieved to be finally conveyed along the sieve surface and upwards towards a discharge, where it is removed from the cleaning rake with the help of a scraper, for example.

One difficulty encountered when building the corresponding devices (hereinafter also named "rakes") is to position the cleaning rake in such a way that when it passes the sieve surface it moves as parallel as possible to the longitudinal direction of the grate bars to prevent a tilting of the cleaning rake. Owing to existing production tolerances, however, this cannot always be achieved without problems.

SUMMARY

Therefore, the task of the present invention is to take this fact into account and to suggest a rake that prevents the above-mentioned tilting.

The task is solved by a device that has the characteristics of the disclosed subject matter.

As is customary in the state of the art, the claimed device has first of all a screen fixed to a frame (e.g. shaped like a frame element fixed to an installation space) that forms a sieve surface with grate bars arranged beside one another and separated from each other by a few centimeters to a few millimeters. Furthermore, at least one cleaning rake with numerous cleaning prongs (preferably arranged adjacent to one another) is provided that with the help of a drive can be moved in such a way in conveying direction along the screen that the cleaning prongs engage at least in sections between adjacent grate bars when they pass the screen. As a result of this, the material to be sieved held back by the grate bars is captured and removed from the screen.

At this point it must be pointed out that the following paragraphs will generally mention only one cleaning rake. Needless to say, however, the rake can also encompass several cleaning rakes separated from one another in conveying direction. Likewise, additional cleaning lips and/or cleaning brushes can be provided that can be moved past the sieve surface with the help of the above-mentioned drive.

Now, to prevent a tilting of the cleaning rake moving along the screen and of the screen itself, the invention provides the cleaning prongs of the cleaning rake to be arranged in such a way that, with regard to the above-mentioned conveying direction and with regard to the screen, they can be moved laterally back and forth. In other words, the invention provides that at least one part of the cleaning prongs (preferably all) is moveably arranged in one direction running parallel to a flat section of the sieve surface and perpendicularly to the movement direction of the cleaning rake that it has while it moves along the above-mentioned flat section of the screen.

Such freedom of movement has the advantage that the cleaning prongs can adapt to the course of the grate bars. If they are not aligned fully parallel to the conveying path of the cleaning rake, then the cleaning prongs can nonetheless follow the free spaces existing between the grate bars without causing a tilting of the cleaning prongs as a result of this.

In the final analysis, the cleaning prongs are thus, on the one hand, moveably arranged in conveying direction and, on the other hand, perpendicularly to it, although in conveying direction, it is always the direction in which the cleaning rake is moving owing to the drive (therefore, the conveying direction does not necessarily have to run in a straight line).

It is especially advantageous if both sides of the cleaning rake are in each case in contact with one of the device's rotating pulling unit and can be moved along a continuous conveying path with the help of the pulling units, from which, in turn, one or both of them are in operative connection with the above-mentioned drive. For example, it could be conceivable to provide the pulling units as continuous chains that run in each case around a lower and upper gear, whereby at least one of the gears mentioned above makes operative contact with the drive. In this case, the cleaning prongs are finally also moveably arranged in the above-mentioned lateral direction relative to the pulling units.

It is also advantageous if the cleaning prongs are arranged in such a way that they can be moved laterally at least 0.5 mm, preferably at least 1 mm, very preferably at least 2 mm. While smaller values should be sufficient with shorter grate bars, larger values make sense when longer grate bars (over three meters long) are used because in this case significant lateral deviations from the ideal position can already be observed with a minor misalignment of the grate bars.

Within the framework of the invention, there is a misalignment when the grate bars are not fully aligned parallel to the longitudinal extension of the pulling units, so that the distance between the individual grate bars to the pulling units running laterally in longitudinal direction of the grate bars changes. To compensate for this lateral positional deviation between the pulling units and the grate bars, the cleaning prongs are finally arranged in such a way that they can be moved laterally, so that their distance to the respective pulling units can also be changed. Thus, the cleaning prongs always engage between the free spaces existing between the grate bars to rule out a tilting of the cleaning prongs.

The lateral mobility mentioned above can be achieved, for example, by moveably arranging the entire cleaning rake on the pulling units in lateral direction. However, it is especially advantageous if the cleaning rake has a support that includes cleaning prongs arranged in it. While both sides of the support should now in each case be connected to a pulling unit, it is advantageous for the cleaning prongs themselves not to be directly connected to the pulling units. If the cleaning prongs are now arranged in such a way on the support that they can be moved in the above-mentioned lateral direction relative to the support, then the cleaning prongs can follow the course of the free spaces existing between the grate bars, even if the support always moves parallel to the pulling units, while the grate bars have an alignment that deviates slightly from an alignment running parallel to the pulling units.

Thus, it is advantageous if the support extends between two parallel running pulling units and has two lateral sections spaced apart from one another, whereby in each case one lateral section makes contact with one pulling unit. Preferably, the support has an elongated basic profile that makes contact with a pulling unit in the area of a lateral front side (i.e., lateral section).

It is likewise advantageous if the cleaning prongs are linearly and moveable arranged with respect to the support, preferably exclusively. For example, the cleaning prongs are guided above a rail or several bolts running in collinear fashion, although a relative movement between the support and the cleaning prongs is prevented in a direction running perpendicularly to the above-mentioned lateral direction of movement. In this case, the relative movement between support and cleaning prongs serves merely to compensate for a slight "non-parallelism" between pulling units and grate bars.

There are special advantages if the cleaning rake has at least one cleaning comb that encompasses several cleaning prongs. In this case, the cleaning prongs are preferably combined into one unit and arranged in such a way on the support above a fastening section of the cleaning comb that the latter is moveable relative to the support (although preferably the support should not be moveably arranged in the lateral direction according to the invention). Preferably, the cleaning comb is additionally developed as one single piece and/or made of plastic. Needless to say, the use of other materials such as (coated or uncoated) metal, for example, is possible as well.

It is also advantageous if the cleaning comb can be detachably fixed to the support with the help of fixing agents. In this case, the cleaning comb can be easily replaced if it wears out too quickly without the need to disassemble the carrier for this. Preferably, the cleaning comb is fixed in place on the support with screws.

It is especially advantageous if the support and/or cleaning comb has/have one or several guiding mechanisms to ensure only a straight—and with regard to the conveying direction, lateral—relative movement between cleaning comb and support. To allow the necessary relative movement between support and cleaning comb, the latter can have, for example, at least one slot aligned in the desired movement direction in which a bolt or screw of the support engages. The guiding mechanism should also limit the relative movement in both lateral directions to prevent the detachment of the cleaning comb from the support while it moves relative to it. For example, to achieve this, the guiding mechanism can have the corresponding stops (which are preferably formed by the above-mentioned slot(s)).

There are more advantages if the support encompasses a collection surface to collect the material to be sieved that falls off the screen while the cleaning rake passes it. The collection surface can be formed, for example, by a metal sheet of the cleaning rake that extends in the width direction of the cleaning rake (i.e. in the direction from a first lateral section connected to the first pulling unit to a second lateral section connected to the second pulling unit). In addition, the collection surface should be aligned in such a way that it overlaps upwardly the existing fixing agents with which the cleaning prongs (or the cleaning comb) are connected to the support when the cleaning rake is guided past the sieve surface. In this case, the fixing agents are protected against mechanical stress.

It is also advantageous if individual cleaning prongs have a varied engagement depth with regard to the screen, so that when they pass it, they engage between the grate bars assigned to them at different depths. Preferably, some of the cleaning prongs engage so far between the respective grate bars that the entire space between the corresponding grate bars is cleaned. In return, cleaning prongs can be provided that engage only partially between the grate bars assigned to them. The forces acting on the cleaning rake are in this case smaller than when all cleaning prongs would engage all the way in the spaces assigned to them. However, so all spaces can always be fully cleaned, it is advantageous to provide several cleaning rakes. In this case, the cleaning prongs provided on the respective cleaning rakes must be arranged in such a way that all spaces are gradually and fully gripped by the cleaning prongs.

It is therefore especially advantageous if at least most of the cleaning prongs are in each case arranged with shallow engagement depth to at least one cleaning prong with deeper engagement depth. For example, on each cleaning rake there could be cleaning prongs that penetrate the spaces fully and alternate with cleaning prongs that engage only partially into the spaces. It could also be conceivable to arrange the cleaning prongs that engage deeply (i.e. the cleaning prongs that fully penetrate the spaces passed through by them) and the cleaning prongs that engage a little (i.e. the cleaning prongs that do not fully penetrate the spaces passed through by them) in each case arranged adjacently to one another in pairs.

Alternatively, it could finally also be conceivable for all cleaning prongs to have the same engagement depth so all the spaces can always be uniformly cleaned.

BRIEF DESCRIPTION OF THE DRAWINGS

Further advantages of the invention are described in the following embodiments, which show schematically in each case.

DETAILED DESCRIPTION

Figure 1:
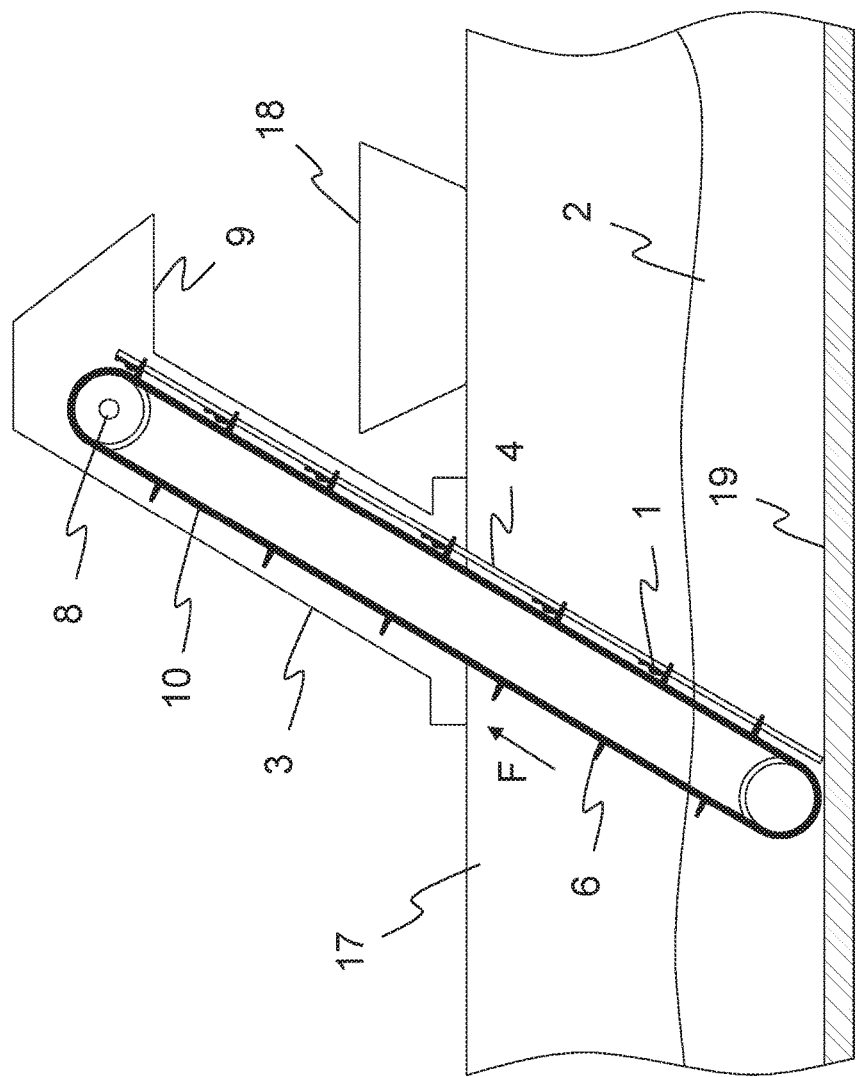
FIG. 1 is a lateral view of a device according to the invention.

To begin with, it should be mentioned that in the figures showing several equal components or sections (such as is the case with the cleaning prongs 7, for example), only one or two of several equal components or sections is partially indicated with reference characters to ensure good clarity.

FIG. 1 shows a device (rake) integrated into a sewer 17 for separating and removing material to be sieved 1 (e.g. in form of stones, branches, etc.). The device has a screen 4 extending obliquely from above into the sewage 2 connected to the sewer bottom 19 and/or a frame 3 of the device by fastening elements (not shown).

Furthermore, with regard to the sheet level, the device has two pulling units 10 (in form of circulating chains, for example) arranged behind one another and separated from each other that can be moved around the screen 4 with the help of a drive 8 and are connected to one another via several intermediate cleaning rakes 6 (possibly, only one cleaning rake 6 could be sufficient). The circulating chains are guided along their track by lateral guiding mechanisms, whereby the guiding mechanism can be placed in the upper and lower turn-around area, but also in the intermediate areas, in which the pulling units 10 run parallel to one another.

Figure 3:
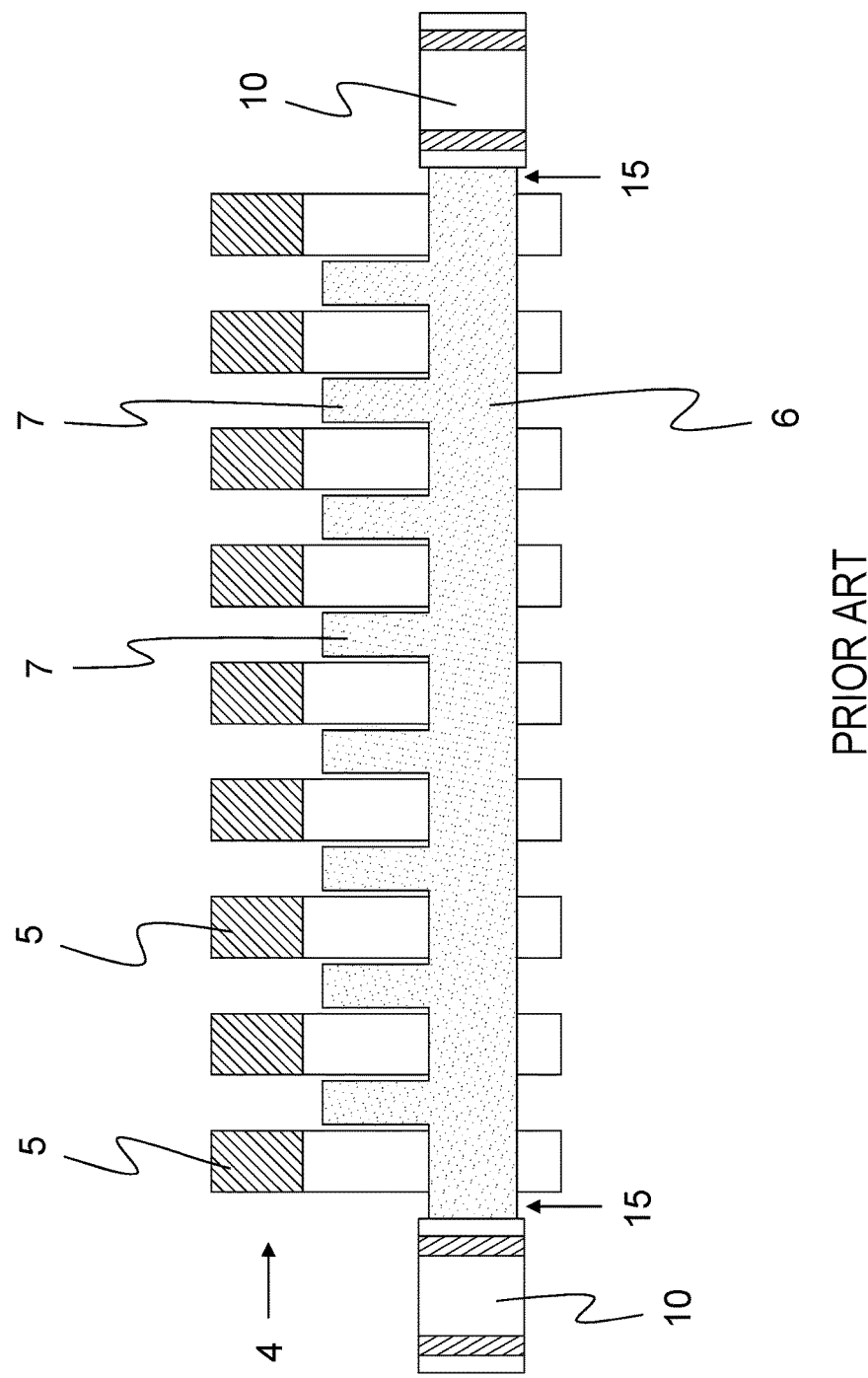
FIG. 3 is a top view of a section of a known device for separating and removing material to be sieved from a flowing liquid contaminated with material to be sieved.

In turn, the cleaning rake 6 encompasses numerous cleaning prongs arranged beside one another that engage in the spaces of the screen 4 when the cleaning rake 6 skims by the front part of the screen 4 oriented upstream when the pulling units 10 are powered in conveying direction F (in terms of FIG. 1, clockwise) (cf. also FIG. 3; although it shows a conventional cleaning rake 6, the interaction principle between grate bars 5 and cleaning prongs 7 corresponds, with the exception of the missing lateral mobility of the cleaning prongs 7, to the principle of the device according to the invention).

The material to be sieved 1 held back by the screen 4 (the sewage current flows from left to right in FIG. 1) is finally captured by the cleaning rakes 6 or their cleaning prongs 7 and conveyed upward. Before the upper turning point is passed, it eventually reaches a guiding sheet metal plate in the discharge 9 area, and from there into the exterior and a container 18, for example. The cleaning rake 6 is finally once again guided to the lower turning point so the cycle can begin again.

Figure 2:
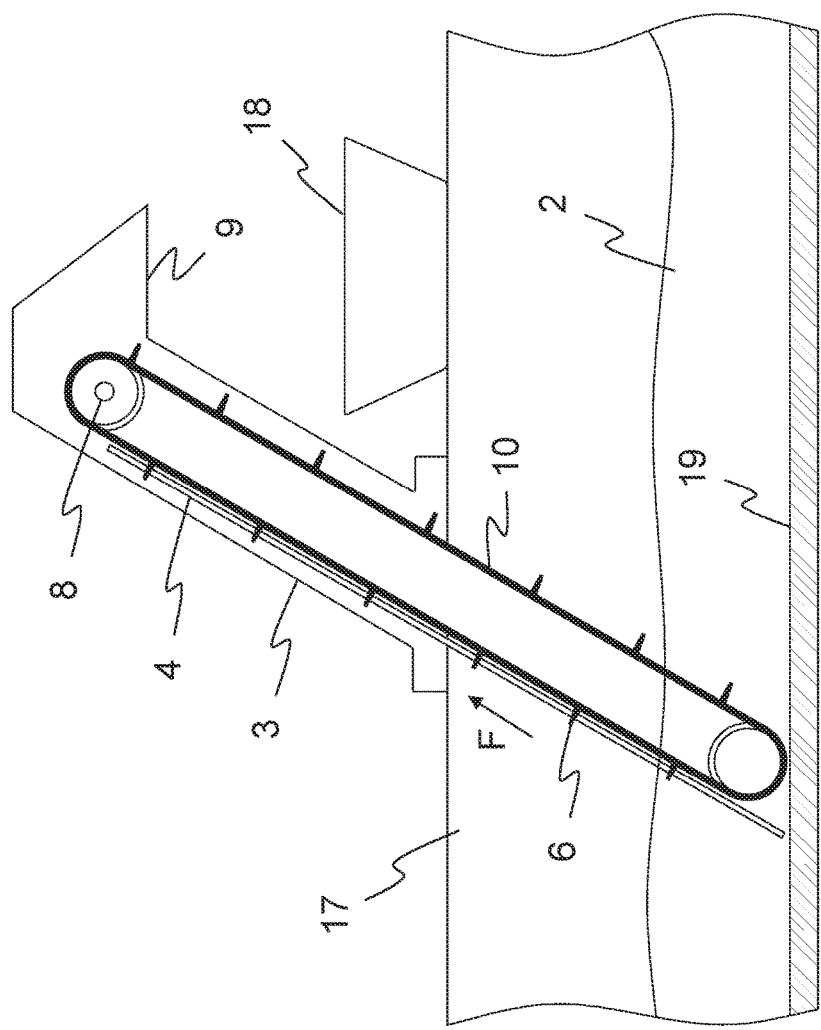
FIG. 2 is a lateral view of a another device according to the invention.

As FIG. 2 shows, the screen 4 must not necessarily be combed by the cleaning rakes 6 from the front (seen in the flowing direction of the sewage 2). Likewise, the embodiment shown in FIG. 2, in which the grate bars 5 are combed "from the back", is conceivable. Thus, the embodiments shown in FIGS. 1 and 2 represent merely possible applications of the invention.

As FIG. 3 now shows, it is necessary for the rake grate cleaning process that the cleaning prongs follow the existing spaces between the grate bars 5 so they can engage in them without tilting. In the state of the art (as FIG. 3 shows), it is therefore absolutely necessary for the grate bars 5 to run parallel to the two pulling units 10 connected to the cleaning rake 6 on both sides because the lateral space between the grate bars 5 and the cleaning prongs 7 is very small and thus allows little play.

To ensure a tilt-free engagement of the cleaning prongs 7 in the corresponding spaces, the invention suggests arranging the cleaning prongs 7 in such a way that they are moveably arranged in a lateral direction relative to the pulling units 10.

Figure 4:
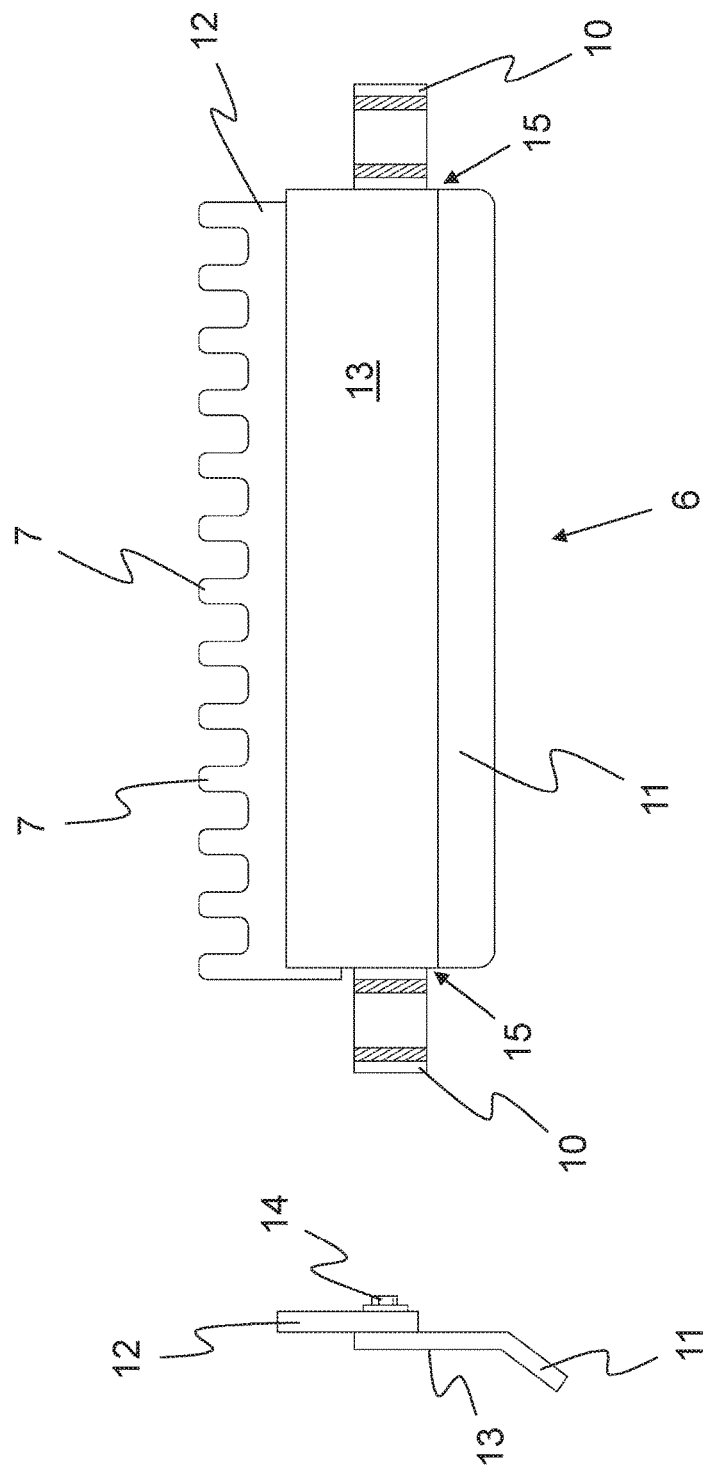
FIG. 4 is a lateral view (left) and a top view (right) on a cleaning rake developed according to the invention of a device according to the invention.

FIG. 4 now shows a possible design of a cleaning rake 6 that allows the desired lateral movement of the cleaning prongs 7 (with respect to the right depiction in FIG. 4, "lateral" means to the left and right). While the right depiction shows a top view of a cleaning rake 6, a corresponding lateral view is seen in the left depiction, although the depiction of the pulling units 10 was dispensed with here.

In any case, the right depiction in FIG. 4 shows that the cleaning prongs 7, formed by a one-piece cleaning comb 12 in the example shown, are displaced at most to the left, whereby the displacement took place relative to a support 11 carrying the cleaning comb 12 (the former is, in turn, arranged in a non-displaceable way on the pulling units 10 in the area of its lateral sections 15). Likewise, owing to its position on the support 11, the cleaning comb 12 could also be displaced to the right, and in this case it would protrude as far to the right above the support 11 as it projects over it in FIG. 4 to the left above it.

In other words, the cleaning comb 12 can be moved laterally back and forth so it can follow the exact course of the grate bars 5, which are not necessarily oriented exactly parallel to the pulling units 10.

Figure 5:
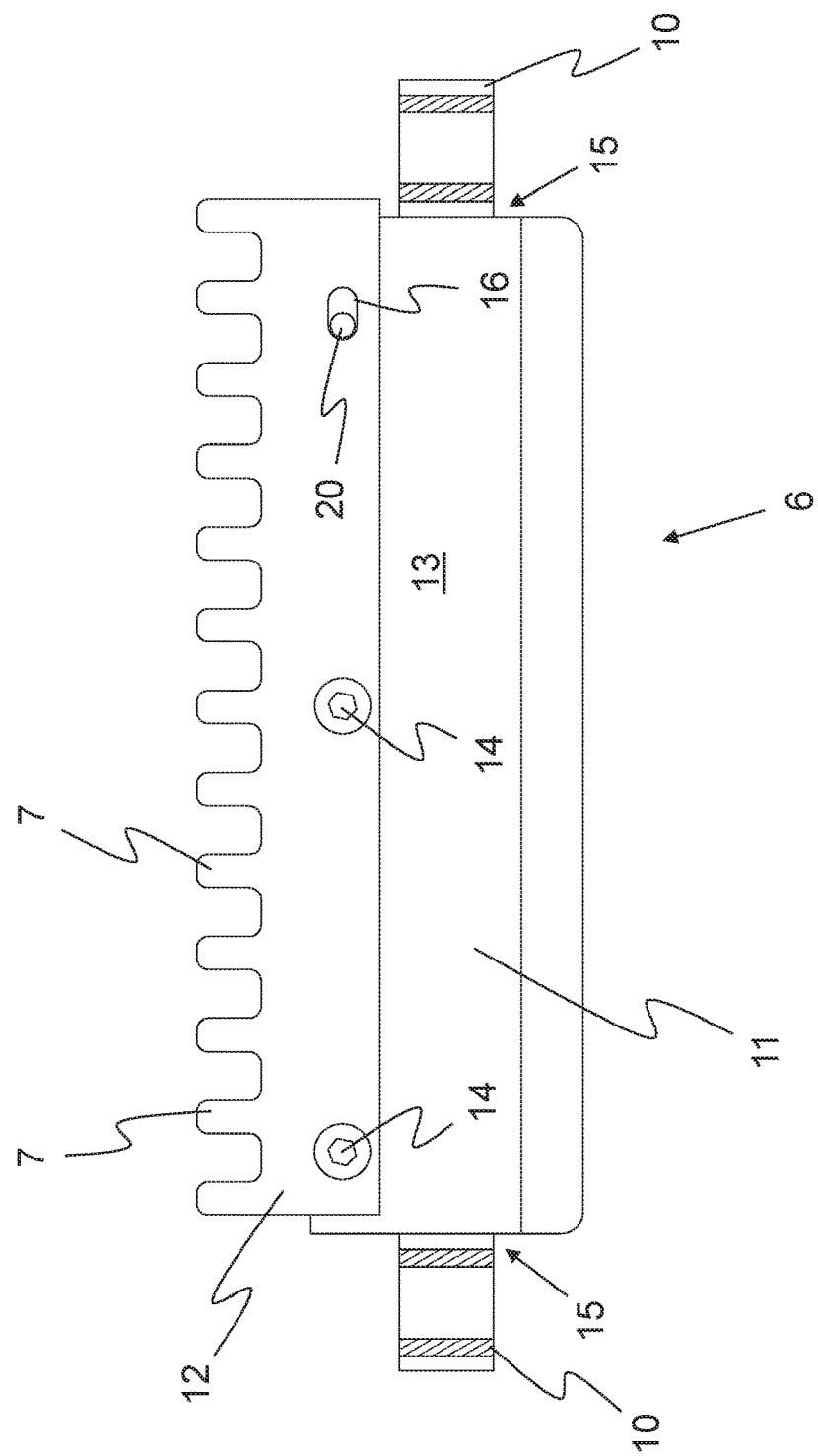
FIG. 5 is a bottom view of the cleaning rake shown in FIG. 4.

Finally, FIG. 5 (bottom view of the cleaning rake 6 shown in FIG. 4) shows a possible position of the cleaning comb 12 on the support 11. For example, it could be conceivable for the cleaning comb 12 to have one or several guiding mechanisms 16 (e.g. in form of the slots shown) penetrated by fixing agents 14, preferably the screws shown, whereby the screws, in turn, engage in corresponding inner threads 20 of the support 11 (for a smooth relative movement between support 11 and cleaning comb 12, it would naturally be advantageous if spacer rings (not shown) penetrated by the screws are provided in the slots so the screws can be tightened without fixing the cleaning comb 12 in a clamping way while doing so). Apart from that, it should be pointed out that, with regard to FIG. 5, that a guiding mechanism 16 (slot) shown exclusively on the right is also present below the fixing agent 14 shown on the left and center. Likewise, there is naturally also a one fixing agent 14 (this was just removed in FIG. 5 so the guiding mechanism 16 can be seen) in the area of the guiding mechanism 16 shown on the right when the device is operating.

In any case, it is advantageous if the support 11 encompasses a collection surface 13 for material to be sieved 1 that covers the fixing agents 14 and the guiding mechanism 16 too when the screen 4 passes upward, in order to prevent excessive contamination or the mechanical stress of the fixing agents 14 or of the guiding mechanism 16 caused by the material to be sieved 1 that skims by.

To conclude, it should be pointed out that the cleaning prongs 7 shown in FIGS. 4 and 5 can have different engagement depths (the engagement depth is the depth with which the cleaning prongs 7 penetrate into the spaces between the grate bars 5). For example, it could be conceivable for the longer cleaning prongs 7 (i.e. cleaning prongs 7 with larger engagement depth) to alternate with shorter cleaning prongs 7 (i.e. cleaning prongs 7 with lower engagement depth). Likewise, two longer cleaning prongs 7 arranged beside one another could alternate with two shorter cleaning prongs 7 arranged beside one another.

The present invention is not restricted to the embodiments shown and described. Variations within the framework of the patent claims are just as possible as any combination of the characteristics described, even if they are depicted and described in different parts of the description or the claims or in different embodiments.

We claim:

1. A device for separating and removing material to be sieved from a flowing liquid comprising:
    a screen that forms a sieve surface and is fixed to a frame, the screen having grate bars arranged beside one another and separated from each other; and
    at least one cleaning rake with numerous cleaning prongs moveable via a drive in a conveying direction along the screen so that each of the cleaning prongs engages at least in sections between adjacent grate bars when the rake passes so that the material to be sieved that is held back by the screen can be removed and conveyed towards a discharge of the device by the rake, the cleaning prongs being positioned so as to be movable laterally back and forth with regard to the conveying direction and with regard to the screen.

2. The device according to claim 1, further including two revolving pulling units, the cleaning rake having two sides, each side being connected with a respective revolving pulling unit, the rake being movable along a continuous conveying path via the pulling units.

3. The device according to claim 1, wherein the cleaning prongs are configured to be movable laterally at least 0.5 mm.

4. The device according to claim 1, wherein the cleaning rake includes a support in operative connection with and movable via the drive, wherein the cleaning prongs are mounted on the support so as to be moveable relative to the support.

5. The device according to claim 4, wherein the cleaning prongs are movable in a linear direction with regard to the support.

6. The device according to claim 4, wherein the support extends between two parallel pulling units and has two lateral sections, each lateral section being in contact with a respective pulling unit.

7. The device according to claim 4, wherein the cleaning rake has at least one cleaning comb including several cleaning prongs, wherein the cleaning comb is mounted on the support so as to be movable relative to the support.

8. The device according to claim 7, wherein the cleaning comb is detachably fixed to the support via fixing agents.

9. The device according to claim 4, wherein at least one of the support and the cleaning comb includes at least one guiding mechanism to ensure only straight and, with regard to the conveying direction, lateral relative movement between the cleaning comb and the support.

10. The device according to claim 4, wherein the support includes a collection surface for capturing the material to be sieved falling off the screen while the cleaning rake passes the screen, wherein the cleaning prongs are connected to the support via fixing agents, and wherein the fixing agents are located such that when the fixing agents pass the sieve surface, the fixing agents are located below the collection surface.

11. A device for separating and removing material to be sieved from a flowing liquid comprising:
    a screen that forms a sieve surface and is fixed to a frame, the screen having grate bars arranged beside one another and separated from each other; and
    at least one cleaning rake with numerous cleaning prongs moveable via a drive in a conveying direction along the screen so that each of the cleaning prongs engages at least in sections between adjacent grate bars when the rake passes so that the material to be sieved that is held back by the screen can be removed and conveyed towards a discharge of the device by the rake, the cleaning prongs being positioned so as to be movable laterally back and forth with regard to the conveying direction and with regard to the screen, wherein individual cleaning prongs have different engagement depths with regard to the screen, so that when the cleaning prongs pass the screen the cleaning prongs engage at different depths between the respective grate bars.

12. The device according to claim 11, wherein at least most of the cleaning prongs with a low engagement depth are arranged adjacently to at least one cleaning prong with a larger engagement depth.

13. The device according to claim 11, wherein the cleaning rake includes a support in operative connection with and movable via the drive, wherein the cleaning prongs are mounted on the support so as to be moveable relative to the support.

14. The device according to claim 13, wherein the cleaning prongs are movable in a linear direction with regard to the support.

15. The device according to claim 13, wherein the support extends between two parallel pulling units and has two lateral sections, each lateral section being in contact with a respective pulling unit.

16. The device according to claim 13, wherein the cleaning rake has at least one cleaning comb including several cleaning prongs, wherein the cleaning comb is mounted on the support so as to be movable relative to the support.

17. The device according to claim 16, wherein the cleaning comb is detachably fixed to the support via fixing agents.

18. The device according to claim 13, wherein at least one of the support and the cleaning comb includes at least one guiding mechanism to ensure only straight and, with regard to the conveying direction, lateral relative movement between the cleaning comb and the support.

* * * * *